(12) United States Patent
Kerfoot

(10) Patent No.: US 7,326,002 B2
(45) Date of Patent: Feb. 5, 2008

(54) SPARGE BROADCASTING IN FRACTURE ROCK

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 0 days.

(21) Appl. No.: 11/073,934

(22) Filed: Mar. 7, 2005

(65) Prior Publication Data

US 2006/0198704 A1    Sep. 7, 2006

(51) Int. Cl.
*B09B 1/00* (2006.01)

(52) U.S. Cl. .............................. 405/128.25; 405/128.45

(58) Field of Classification Search ........... 405/128.25, 405/128.45, 128.3
See application file for complete search history.

(56) References Cited

U.S. PATENT DOCUMENTS

| 5,611,642 | A | * | 3/1997 | Wilson | .................. | 405/128.45 |
| 6,458,271 | B1 | * | 10/2002 | Naftz et al. | .................. | 210/170 |
| 6,913,419 | B2 | * | 7/2005 | Shiau | .................... | 405/128.25 |
| 2003/0155288 | A1 | * | 8/2003 | Kerfoot | ...................... | 210/199 |

\* cited by examiner

*Primary Examiner*—John Kreck
(74) *Attorney, Agent, or Firm*—Fish & Richardson P.C.

(57) ABSTRACT

Apparatus and method for removal of contaminants from a formation are described. The apparatus and method introduces at a first location treatment materials at concentrations to effect removal of contaminants into a formation and withdraws fluid from a second location that is spaced from the first location feeding withdrawn fluid back to the first location.

27 Claims, 5 Drawing Sheets

SPARGE BROADCASTING IN FRACTURE ROCK

BACKGROUND

This invention relates generally to water remediation systems.

There is a well-recognized need to clean-up contaminants found in ground water, i.e., aquifers and surrounding soil formations. Such aquifers and surrounding soil formations may be contaminated with various constituents including organic compounds such as, volatile hydrocarbons, including chlorinated hydrocarbons such as dichloroethene (DCE), trichloroethene (TCE), and tetrachloroethene (PCE). Other contaminates that can be present include vinyl chloride, 1,1 trichloroethane (TCA), and very soluble gasoline additives such as methyl tertiary butyl ether (MTBE). At times these contaminants and others are found in fractured rock formations beneath the earth's surface. Other contaminants may also be encountered

SUMMARY

According to an aspect of the present invention, a method for removal of contaminants from a formation includes introducing at a first location treatment materials at concentrations to effect removal of contaminants into a formation and withdrawing fluid from a second location that is spaced from the first location and feeding withdrawn fluid back to the first location.

The following are within the scope of the present invention. The treatment material is entrapped in fine bubbles that are in a range of about 0.1 microns to 200 microns in diameter. Withdrawing uses a plurality of withdrawal wells. Introducing uses at least one injection well. Introducing includes pulsing ambient air including ozone into the formation and pulsing withdrawal of the fluid from the second location to feed the withdrawn fluid back to the first location. Introducing can include providing at least one injection well to introduce ambient air and ozone as fine bubbles and providing a plurality of withdrawal wells to withdraw fluid from the formation as ambient air and ozone are injected into the formation. Introducing can also include pulsing ambient air including the ozone into the formation from the injection well and pulsing withdrawal of the fluid from the plurality of withdrawal wells to deliver the withdrawn fluid back to the first location. Introducing includes introducing a treatment material selected from the group consisting of ambient air including ozone, air, oxygen-enriched air, catalyzed Ozone (OH•); Fenton's Reagent; Ozone (Gas); Ozone (Molecular); Permanganate; Nitrous Oxide; Hydrogen Peroxide; Hydrogen (gas); Hydrogen sulfide, ($H_2S$) a Sulfite ($HSO_3^{2-}$) and Ferrous iron ($Fe^{2+}$) as a sulfate. The treatment material is entrapped in fine bubbles that are in a range of about 0.1 microns to 80 microns in diameter.

According to an additional aspect of the present invention, a method for removal of contaminants from a formation includes introducing treatment materials at concentrations to effect removal of contaminants into the formation, through a well disposed at a first location and operating a pump disposed in a second well at a second location that is spaced from the first location, to draw fluid through the formation into the second well and pump the fluid from the second well back to the well at the first location.

According to an additional aspect of the present invention, apparatus for treating contaminants in a soil formation includes an injection well, the injection well including a casing having a screen and a diffuser, disposed in the injection well for broadcasting treatment material through the screen into a formation. The invention also includes at least one withdrawal well, the withdrawal well including a second casing having a screen, a pump and a line coupled to the pump to feed fluids that enter the withdrawal well back to the injection well.

According to an additional aspect of the present invention, an apparatus for treating contaminants in a soil formation includes a first injection well, the injection well including a first casing having a first well-screen, a first pair of packers disposed in the first casing and forming a first confined chamber about the location of the first well-screen in the first casing and a diffuser, disposed in the first confined chamber. The apparatus also includes at least one withdrawal well, the withdrawal well, including a second casing having a well-screen, a second pair of packers disposed in the second casing and forming a second confined chamber about the location of the second well-screen in the second casing, and a pump, disposed in the second confined chamber. A fluid line is coupled to the pump to feed fluids that enter the second well back to the first confined chamber in the injection well.

One or more of the following advantages may be provided by one or more aspects of the invention.

The invention enables a technique for sparging in fractured rock formations. Fractured rock formations present difficult challenges for effective sparging type treatments. Depending on the configuration and the diameter of the piping between wells a pulse-wave of long duration can be use to pull materials out of side fractures or to transmit material laterally along the fracture zone. Additionally, dead-end fractures generally do not receive significant amounts of treatment materials making treatment difficult. In addition, such fractures do not experience significant amounts of mixing. By pulsing, one can agitate material in these dead-end zones providing a scrubbing type of action due to the compressibility of the gas-liquid treatment material. Additionally, the broadcasting approach can use directionally features of directional microporous diffusers, to treat an area by sequencing in various configurations at the same time as providing circular hydraulic containment that can assist in avoiding transmission of heavy concentrations of mobilized contaminant to other areas.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
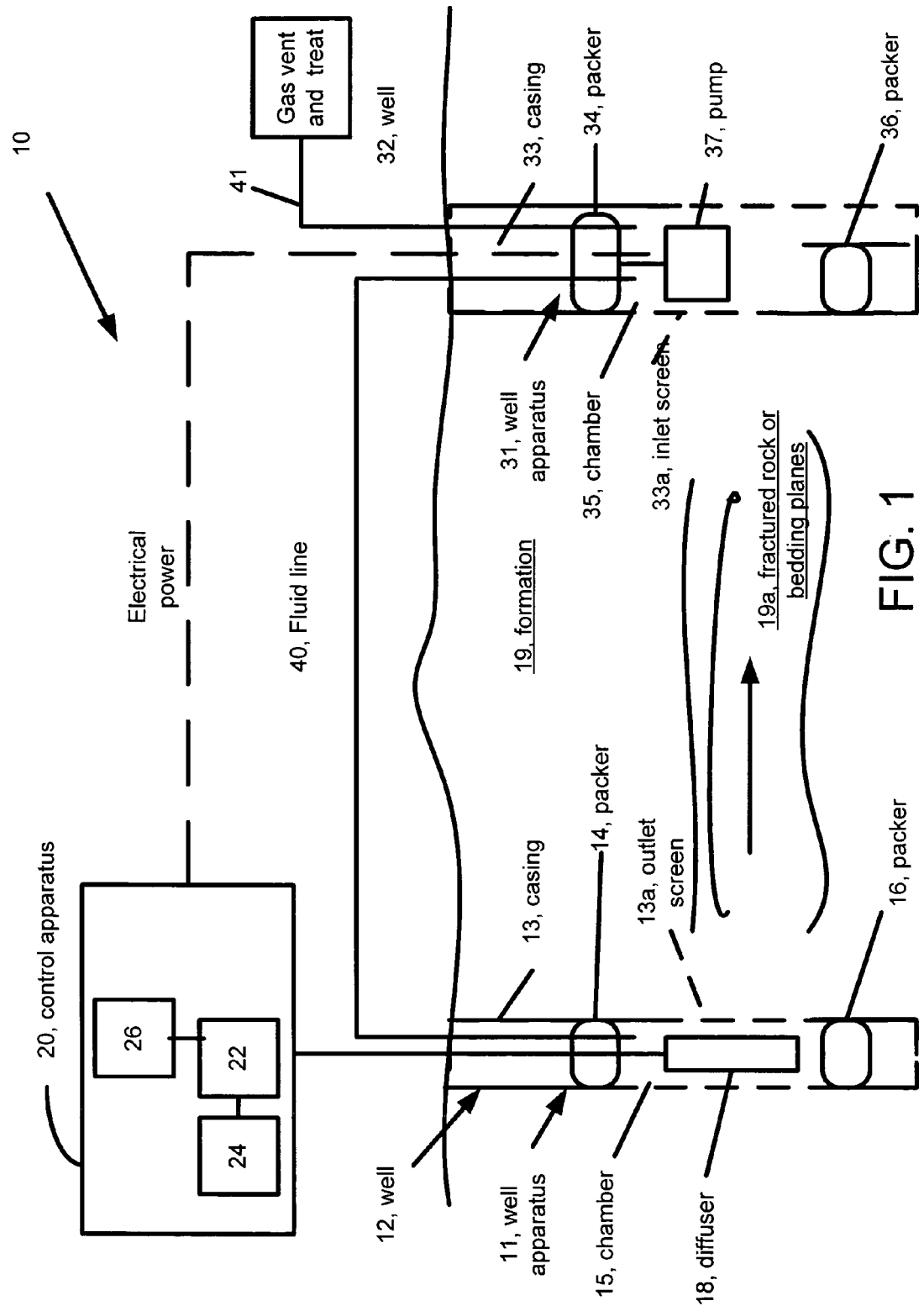
FIG. 1 is a block diagram depicting an arrangement of wells for broadcasting in fractured rock formations.

Referring now to FIG. 1, a sparging arrangement 10 for treating plumes, sources, deposits or occurrences of contaminants in formations including fractured rock and an aquifer or underground water deposits is shown. The arrangement 10 includes a first well apparatus 11, disposed in a first well or borehole 12. In this embodiment, well 12 is an injection well. Well apparatus 11 has a casing 13, an upper packer 14 and a lower packer 16. The casing 13, upper packer 14 and lower packer 16 form a first confined chamber 15 in the casing. A diffuser, such as a microporous diffuser 18, e.g., a Spargepoint® available from Kerfoot Technologies, Inc. is disposed in the injection well 12 between the upper and lower packers 14 and 16.

In some configurations, a directional diffuser that is segmented into e.g., quadrants, is used. The directional microporous diffuser is fitted tightly inside the casing and in some embodiments the casing itself can be partitioned (not shown). Details on a directional microporous diffuser are discussed in my U.S. patent application Ser. No. 10/745,939, filed on Dec. 23, 2003, entitled "Directional Microporous Diffuser and Directional Sparging" which is incorporated herein by reference.

An outlet screen 13a is part of the casing 13 about the first confined chamber 15 and is disposed between the packers 14 and 16 in communication with the microporous diffuser 18 to promote broadcast of microbubbles, generated by the microporous diffuser, through the surrounding ground/aquifer region 19. In some arrangements, the surrounding ground/aquifer region 19 is fractured rock layers or bedding planes 19a. The casing 13 supports the ground about the injection well 12. Generally, the injection well 12 can be a deep well or a shallow well. Typically, a sand pack is not needed. However, it can be used in situations where the ground contains fractured slate or shale deposits in well-defined layers. Slate or shale if sufficiently fractured acts as an unconsolidated deposit that is often bounded by impermeable zones, e.g., clays.

The diffusers 18 deliver a treatment material. The treatment material is entrapped in fine or microbubbles that have a diameter in a range of about 0.1 microns to 200, preferably 0.1 to 80 microns, and more preferably about 0.5 microns to 80 microns.

The sparging arrangement 10 also includes a second well apparatus 31 in a withdrawal well 32. The second well 32 has a casing 33 and well apparatus 31 having an upper packer 34 and a lower packer 36. The casing 33, upper packer 34 and lower packer 36 form a second confined chamber 35. The withdrawal well 32 is spaced from the injection well 12 by a horizontal distance that is determined based on hydraulic conductivity. If the hydraulic conductivity is greater than $10^{-2}$ cm/sec spacing of the wells from extraction wells can be 100 or more feet. If the hydraulic conductivity is lower e.g., $10^{-4}$ to $10^{-5}$ cm/sec (i.e., tighter formation) the spacing may be on the order of 10 feet to 30 feet. A pump 37 such as a double mini-pump (e.g., two small DC pumps that can pump to 100 feet of water head) Model 345B available from Kerfoot Technologies, Inc. is disposed in the withdrawal well 32 between the upper and lower packers 34, 36. An inlet screen 33a is disposed between the packers 34 and 36 about the confined chamber 35 in communication with the minipump to promote capture of microbubbles generated by the microporous diffuser exiting from the screen 13a of the injection well 12 through the surrounding ground/aquifer region 19 of, e.g., fractured rock layers or bedding planes. The withdrawal well 32 is in fluid communication with the first well 12. The withdrawal well 32 withdraws water and other fluids from the surrounding formation and delivers the withdrawn fluids, via a line 40, back to the injection well 12, because of pumping by the mini-pump 33. Generally, there is no need for a sand pack around the withdrawal well 32. A line 41 connects a region within the second well, e.g., between the two packers, such as above the pump to a conventional gas vent and treatment apparatus, e.g., activated charcoal, carbon, etc. filter.

For either or both of the injection well 12 and withdrawal well 32, the respective casings can be constructed to include plural regions of well screen and the respective pairs of packers and microporous diffusers and pump can be vertically relocated within the respective injection and withdrawal wells to change the vertical level of injection and/or withdrawal to accommodate differences in the fractured rock formations. Alternatively, the well apparatus 11 and 31 can be configured to have multiple diffusers and pumps disposed at respected plural vertical distances in the wells 12 and 32.

The arrangement 10 also includes control apparatus 20 such as a C-Sparger® controller assembly available from Kerfoot Technologies, Inc. In general, the C-Sparger® or an equivalent control apparatus would include an air compressor/pump 22 and compressor/pump control mechanism 24, e.g., timer and sequencer. In one particular example, the treatment materials delivered by the control apparatus include an air/ozone gas stream. Thus, the control apparatus is coupled to an ozone (O3) generator 26 to feed a mixed feed of air/ozone to the microporous diffuser 18.

Exiting from walls of the microporous diffuser 18 are microbubbles of entrapped treatment material, e.g., air and ozone. Such encapsulated micron size bubbles of air/ozone affect substantial removal of below-mentioned or similar types of contaminants. The control apparatus 20 can also include a pump (not shown) that supplies accelerants such as catalyst agents including iron containing compounds such as iron silicates or palladium containing compounds such as palladized carbon. In addition, other materials such as platinum may also be used. The control apparatus 20 is particularly adapted to deliver pulses of air/ozone to the microporous diffuser 18. The minipump 33 receives electrical pulses from the controller assembly 20 that causes the minipump to pump water from the withdrawal well 32 and deliver the water to the injection well 12. This pumping causes a gradient to be formed between the two wells, through the underlying rock formation. The broadcasting approach can use the directionally features of the directional microporous diffusers, to treat an area by sequencing in various configurations, that can assist in avoiding transmission of heavy concentrations of contaminant to other areas. Depending on the configuration and the diameter of the piping between wells a pulse-wave of long duration can be use to pull materials out of side fractures or to transmit material laterally along the fracture zone. For example, dead-end fractures generally would not receive significant materials and would not experience significant amounts of mixing. By pulsing, one can agitate material in these dead-end zones providing a scrubbing type of action due to the compressibility of the gas-liquid treatment material.

Figure 2:
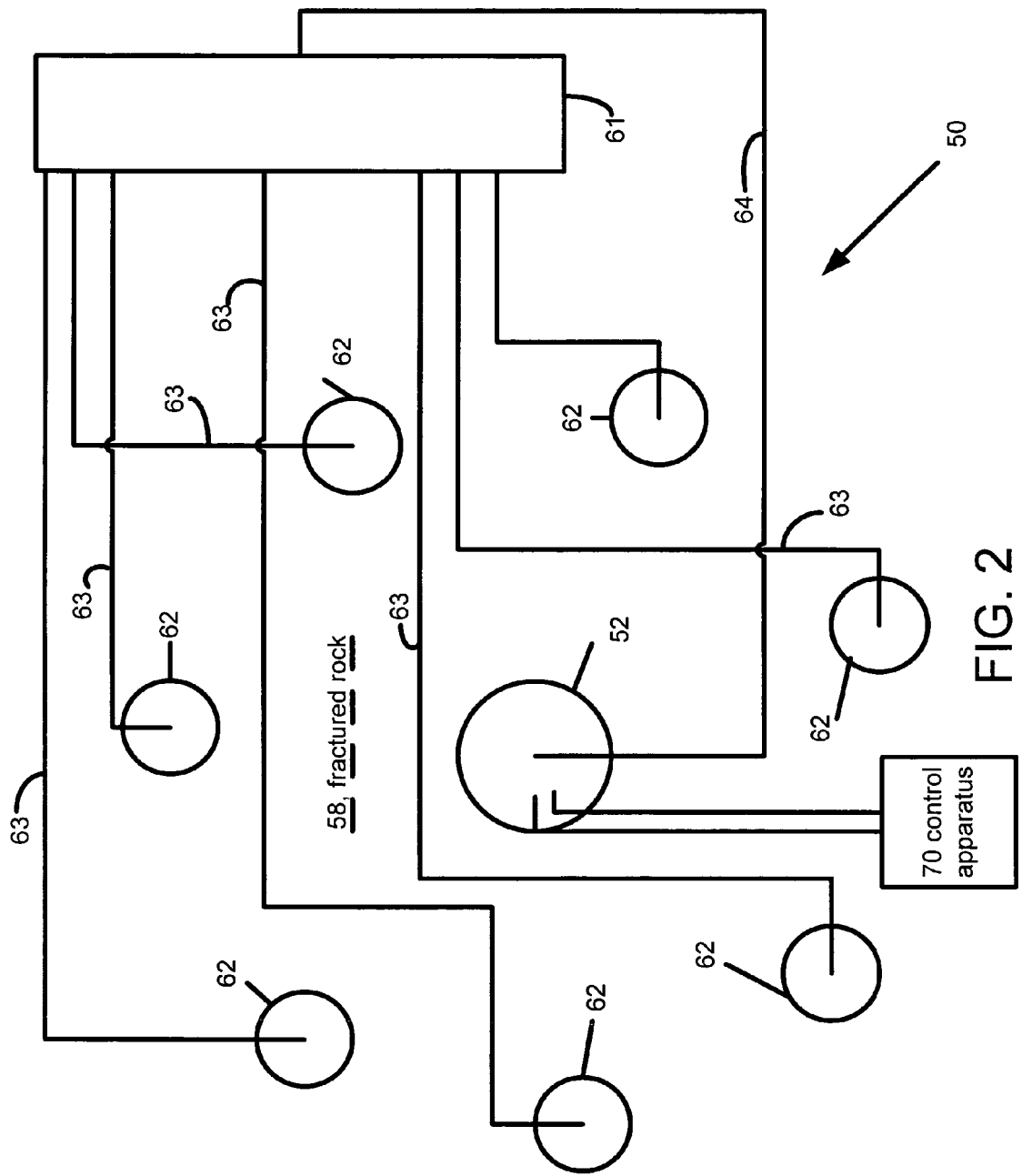
FIG. 2 is a block diagram depicting an alternative arrangement.

Referring now to FIG. 2, an alternative sparging arrangement 50 for treating plumes, sources, deposits or occurrences of contaminants in fractured rock formations is shown. Although seven injection wells are shown surrounding one withdrawal well, more or less injection wells could be used. The arrangement 50 includes an injection well 52 surrounded by a plurality of withdrawal wells 62. The injection well can include a plurality of fluid lines that feed water and other fluids from the plurality of withdrawal wells or can include a manifold 61 that connects to a plurality of lines 63, as shown. The manifold 61 has a single line 64 to feed fluid, e.g., water, into the well 52. The manifold would include solenoid controlled valves or check valves (not shown) to prevent back flows into the other withdrawal wells. In general, the injection well 52 is similar in construction as the injection well 12 (FIG. 1) and each of the plurality of withdrawal wells 64 is similar in construction as the withdrawal well 32 (FIG. 1). A line (not shown) connects a region within the second well, e.g., between the two packers, such as above the pump to a conventional gas vent and treatment apparatus, e.g., activated charcoal, carbon, etc. filter. Although seven injection wells are shown surrounding one withdrawal well, more or less injection wells could be used.

The sparging arrangement 50 has the injection well 52 deliver a pulse of air/ozone into the formation and the minipumps (not shown in FIG. 2) in the plurality of withdrawal wells 62 sequentially draw water and other fluids from the formation into the injection well 52. The injection well 52 is spaced from the withdrawal wells by distances that are determined based on hydraulic conductivity, as discussed above. The mini-pumps (not shown in FIG. 2) are disposed in each of the wells 62 to capture microbubbles generated by the microporous diffuser exiting from the screen (not shown in FIG. 2) of the injection well 52 through portions of the surrounding ground/aquifer region 58 of, e.g., fractured rock layers or bedding planes.

Figure 3:
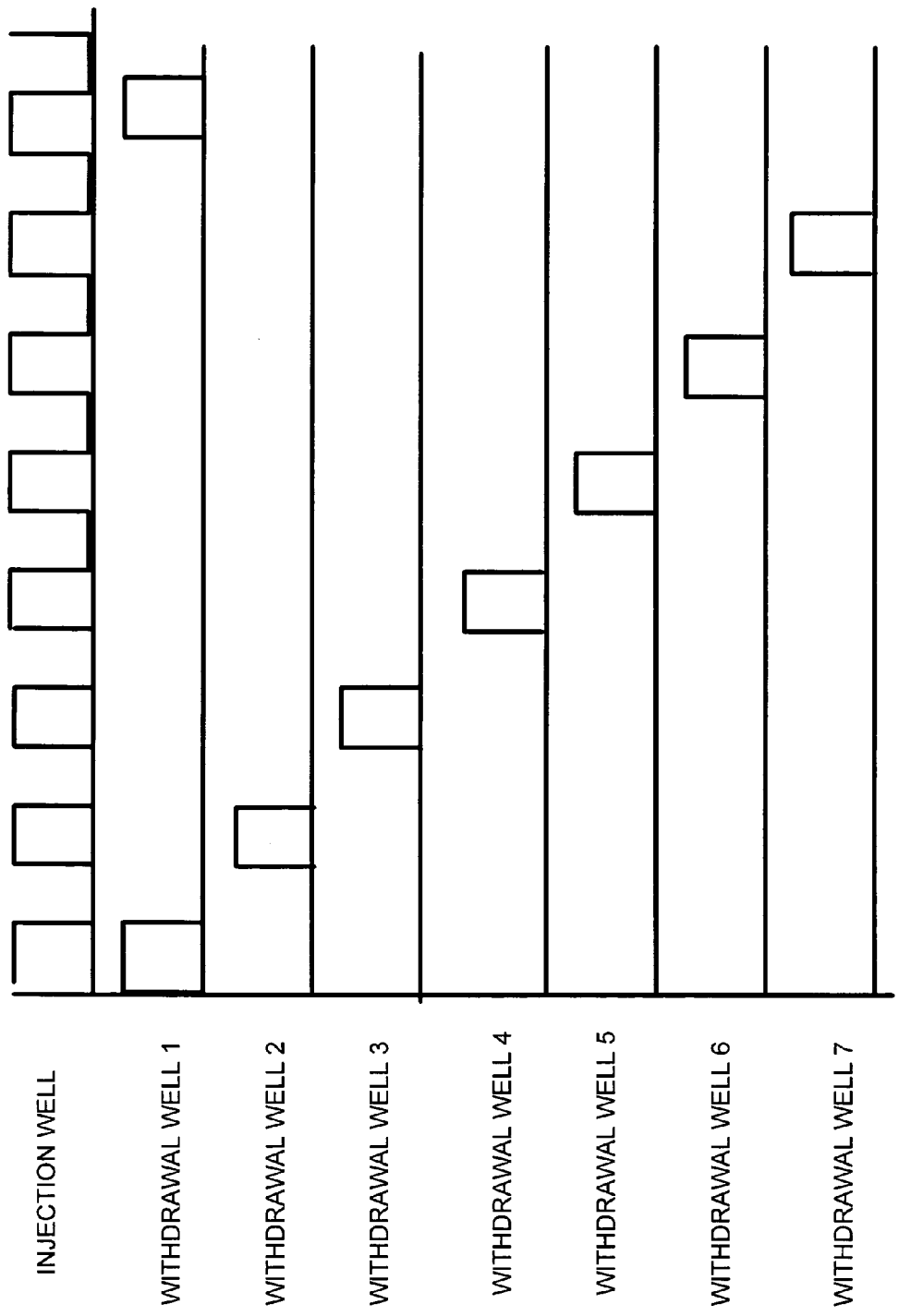
FIG. 3 is a diagram depicting a sequence of timing intervals for control of injection borehole well sequencing.

The arrangement 50 uses a control apparatus 70 such as the control apparatus 20 mentioned in FIG. 1, to feed treatment materials such as a mixed feed of air/ozone to the microporous diffuser (not shown in FIG. 2). The mini-pumps (not shown in FIG. 2) receive electrical pulses from the controller assembly 20 via lines (not shown in FIG. 2) that cause the mini-pumps to pump water from the withdrawal wells 62 in a sequence determined by the pulses. A typical pulsing sequence is shown in FIG. 3.

Figure 4:
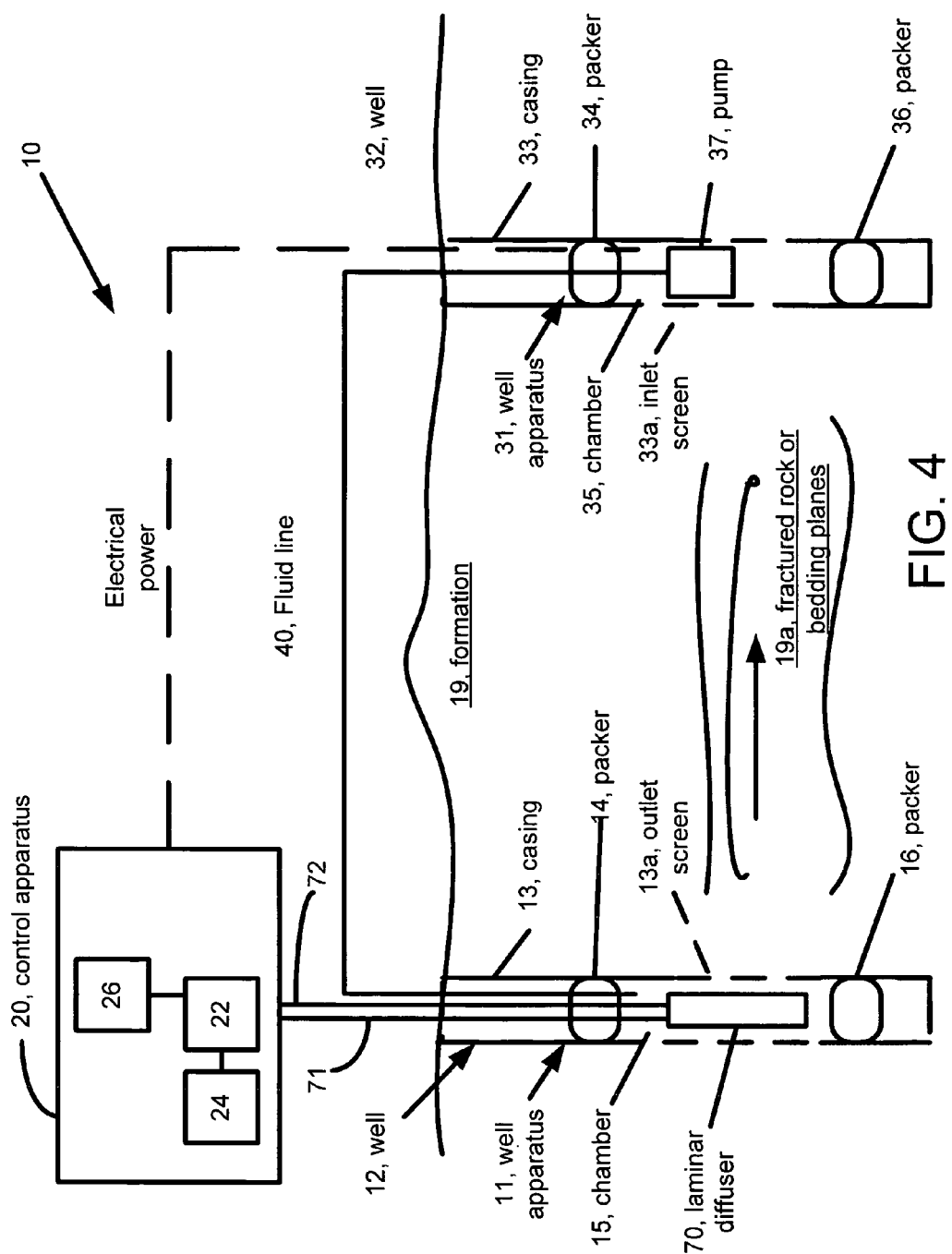
FIG. 4 is a block diagram depicting an arrangement of wells for broadcasting in fractured rock formations using laminar microporous diffuser.

Referring to FIG. 4, the arrangement 10 or 50 can incorporate a laminar microporous diffuser 70. Exemplary constructions for the laminar microporous diffuser 70 are shown in my Issued U.S. Pat. No. 6,436,285. Either of the two constructions shown in that patent can be used, as can other similar types of laminar microporous diffusers. In FIG. 4, details of the arrangement 10 are illustrated, and the details, for the sake of clarity, are not repeated here to the extent they are similar to that previously described.

The laminar microporous diffuser 70 allows introduction of multiple fluid streams, as illustrated via lines 71 and 72. The laminar microporous diffuser 70 has at least two inlets (not shown). For deep-well sparging, at least one of the inlets introduces a first gas stream about the periphery of the laminar microporous diffusers 70 and another inlet introduces a second gas stream within interior regions of the laminar microporous diffusers 70. The gas streams can be the same gas or preferable are different. In the embodiment described, the first gas stream is ozone and the second is air. This allow the ozone generator 28 (FIG. 1) to work under a siphon condition rather than requiring a high back pressure condition in order to efficiently deliver ozone and produce micron size bubbles of air/ozone at great depths in the well 12. The ozone generator 28 under a siphon condition is advantageous for operation of the ozone generator at optimal efficiency and delivery of optimal amounts of ozone into the well, especially if the ozone generator is a corona discharge type. The pump 22 feeds an air stream and induces a negative pressure on the ozone stream that is fed from pump 26 when both streams are fed through the microporous diffusers 70.

Thus, the microbubbles trap a gas. The fine bubbles have a diameter in a range of about 0.1 microns to 200 microns in diameter. In some arrangements (depending on the source of material used), the bubbles will have an initial specific gravity characteristic of upon injection in a range of 1.0 to 2.0. By having a specific gravity characteristic greater that that of water (sg=1) the bubbles can be more useful in treating hard to reach fissures, etc. in the fractured rock formations.

In particular, with the microporous diffusers 70 and use of an outer port to introduce a stream of ozone, the microbubbles are produced in the microporous diffuser by bubbling air through a central cylinder (not shown in FIG. 2) of the microporous diffusers and into the surrounding outer regions of the microporous diffusers where it is mixed with the ozone. This arrangement thus can be used to treat deep deposits of contaminants. While it can treat shallow deposits it is especially useful to treat deposits that are deep into the earth's surface since by producing a negative pressure it allows the ozone stream to overcome the backpressure in the well, without requiring the ozone generator to work under high back pressure conditions. Corona type ozone generators tend to lose efficiency when operated at high backpressures. For instance, doubling of pressure in the ozone generator to overcome large backpressures can result in an effective reduction by 75% in ozone production compared to what the ozone generator could produce at ambient pressure conditions. Under this arrangement, ozone can be supplied at a flow rate of for example, 0.5-50 cubic feet per hour (CFH) of ozone and 2 to 20 cubic feet per minute of air. An exemplary set of rates is for 2-inch wells 3-5 CFM total gas (air and ozone) with ozone being $1/20^{th}$ to $1/100^{th}$ of the total volume.

Alternatively, the treatment system 10 or system 50 can use the microporous diffuser 70 arranged to deliver a ozone/air mixture in interior portions of the diffuser and a liquid coating on bubbles that emerge from the diffusers, as generally described in my Issued U.S. Pat. Nos. 6,436,285; 6,582,611; and 6,805,798, which are incorporated herein by reference in their entirety. These patents discuss a gas-gas reaction of contaminant vapors with ozone supplemented by a liquid phase reaction provided by a flow of hydrogen peroxide, or hydroperoxides. The microbubbles produced from the air/ozone escaping the microporous diffuser 70 become coated with a thin film coating of hydrogen peroxide or other hydroperoxides over surfaces of the bubbles.

Contaminants which can be treated or removed using the processes described above include hydrocarbons and, in particular, volatile chlorinated hydrocarbons including halogenated volatile organic compoundes such as tetrachloroethene (TCE), trichloroethene, cisdichloroethene, transdichloroethene, 1-1-dichloroethene and vinyl chloride and (PCE). In particular, other materials can also be removed from the stream including chloroalkanes, including 1,1,1 trichloroethane, (TCA) 1,1, dichloroethane (DCA), methylene chloride, and chloroform; benzene, toluene, ethylbenzene, O-xylene, P-xylene, naphthalene and methyltetrabutylether (MTBE). Other compounds commonly treated include, EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, $CO_2$ and $H_2O$ accomplishes this. In the case of petroleum products like BTEX (benzene, toluene, ethylbenzene, and xylenes), the benzene entering the bubbles reacts to decompose to $CO_2$ and $H_2O$.

Also, pseudo Criegee reactions with the substrate and ozone appear effective in reducing saturated olefins like trichloro alkanes (1,1,1,-TCA), carbon tetrachloride ($CCl_4$), chloroform methyl chloride, and chlorobenzene, for instance. Details on the efficacy of the different types of treatments and the suitability of those treatments for the above mentioned and other compounds are discussed in the above patents.

Figure 5:
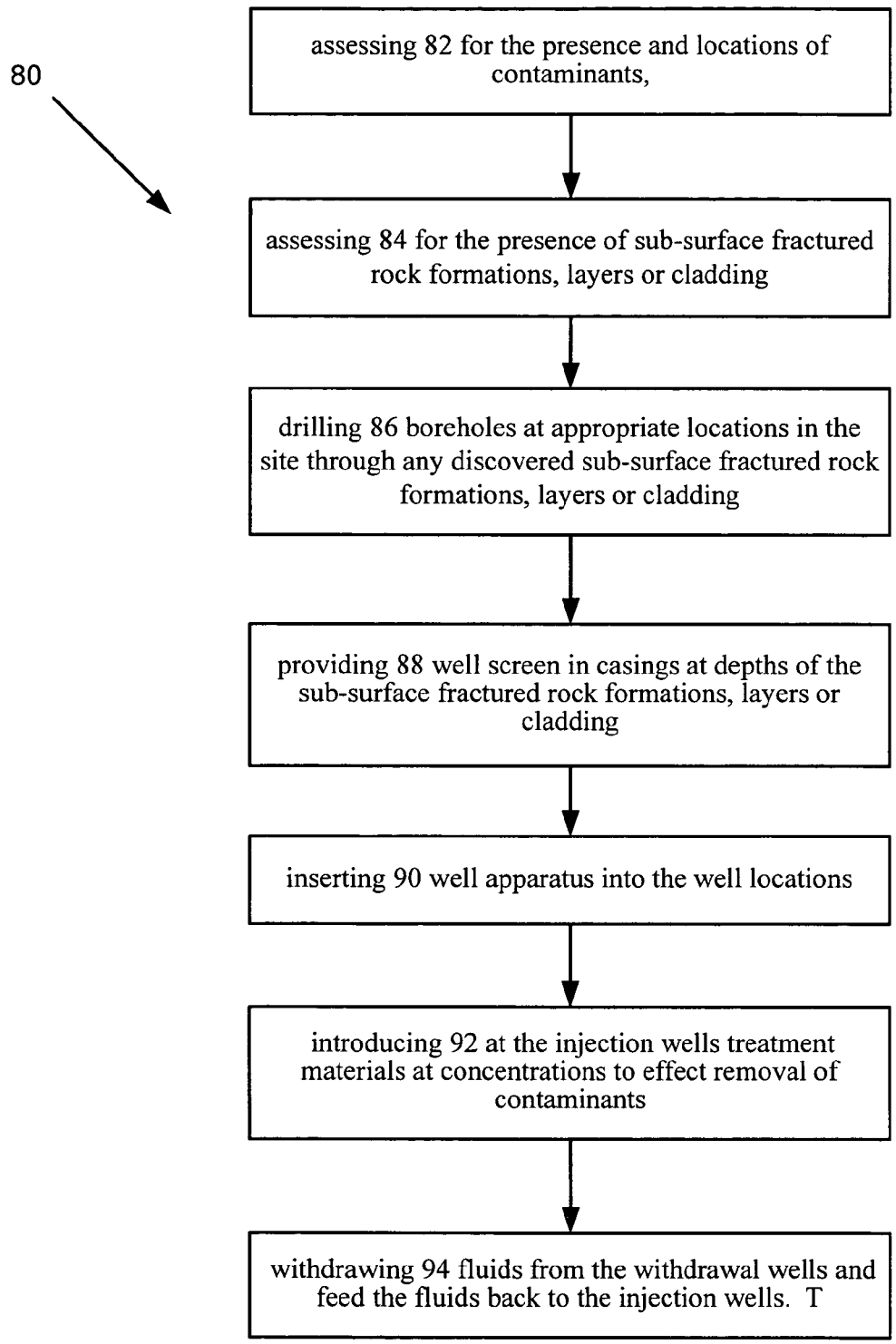
FIG. 5 is a flow chart depicting a process for sparge-based broadcasting in fractured rock formations.

Referring to FIG. 5, a process 80 to broadcast treatment material while sparging the treatment material in fractured rock formations is shown. The process includes assessing 82 the presence and locations of contaminants, assessing 84 for the presence of sub-surface fractured rock formations, layers or cladding. The process involves drilling 86 boreholes at appropriate locations in the site through any discovered sub-surface fractured rock formations, layers or cladding. At the depths of the sub-surface fractured rock formations, layers or cladding well screen is provided 88 in casings that are placed in the appropriate locations and the well apparatus are inserted 90 into the well locations, with well apparatuses 11, for instance, disposed in injection wells 12 and withdrawal apparatuses 31 disposed in withdrawal wells 32. Removal of contaminants from the formation occurs by introducing 92 at the injection wells treatment materials at concentrations to effect removal of contaminants into a formation and withdrawing 94 fluids from the withdrawal wells. The withdrawn fluids are fed back 96 to the injection wells. The arrangement produces a pressure gradient that carries the treatment materials through the sub-surface fractured rock formations, layers or cladding.

A number of embodiments of the invention have been described. Nevertheless, it will be understood that various modifications may be made without departing from the spirit and scope of the invention. For example, the described embodiments use ozone, air and hydrogen peroxides. However, the invention need not be so limited. The invention is directed to use of sparging techniques in fractured rock formations in general, and accordingly other treatment materials such as other oxidizers, e.g., air alone, or oxygen-enriched air, as well as, catalyzed Ozone (OH•); Fenton's Reagent; Ozone (Gas); Ozone (Molecular); Permanganate; Nitrous Oxide; Hydrogen Peroxide; as well as reducing agents such as Hydrogen (gas); Hydrogen sulfide, ($H_2S$) Hydrogen Sulfite ($HSO_3^{2-}$) and Ferrous iron ($Fe^{2+}$) can be used. Accordingly, other embodiments are within the scope of the following claims.

What is claimed is:

1. A method for removal of contaminants from a formation, the method comprises:
   introducing into a formation at a first location, treatment materials at concentrations to effect removal of contaminant, the first location being substantially coextensive with an underlying region of fractured rock or bedding plates within which a contaminant is determined to reside the treatment materials included in coatings of fine bubbles trapping a gas, the fine bubbles having a diameter in a range of about 0.1 microns to 200 microns in diameter with a specific gravity characteristic of the fine bubbles upon injection being in a range of 1.0 to 2.0; and
   withdrawing fluid front a second location that is spaced from the first location, by the underlying region of fractured rock or bedding plates, with the fluid being drawn through the underlying region of fractured rock or bedding plates: and
   feeding withdrawn fluid back into the first location.

2. The method of claim 1 wherein the treatment material includes ozone entrapped in the fine bubbles.

3. The method of claim 1 wherein the treatment material includes hydrogen peroxide included in coatings of the fine bubbles trapping a gas.

4. The method of claim 1 wherein withdrawing further comprises:
   withdrawing the fluid using pumps disposed in a plurality of withdrawal wells to draw the fluid from the first location, through the formation into the plural withdrawal wells.

5. The method of claim 1 wherein introducing further comprises:
   introducing the treatment materials through at least one injection well.

6. The method of claim 1 wherein introducing further comprises:
   pulsing ambient air including ozone into the formation; and
   pulsing withdrawal of the fluid from the second location; and
   feeding the withdrawn fluid back to the first location.

7. The method of claim 1 wherein introducing further comprises:
   providing at least one injection well to introduce ambient air and ozone in the fine bubbles; and
   providing a plurality of withdrawal wells to withdraw fluid from the formation as ambient air and ozone are injected into the formation.

8. The method of claim 6 wherein introducing further comprises:
   pulsing ambient air including the ozone into the formation from the injection well; and
   pulsing withdrawal of the fluid from the plurality of withdrawal wells to deliver the withdrawn fluid back to the first location.

9. The method of claim 1 wherein introducing further comprises:
   introducing a treatment material selected from the group consisting of ambient air including ozone, air, oxygen-enriched air, catalyzed Ozone (OH•); Fenton's Reagent; Ozone (Gas); Ozone (Molecular); Permanganate; Nitrous Oxide; Hydrogen Peroxide; Hydrogen (gas); hydrogen sulfide a Sulfite (SO32−) and Ferrous iron (Fe2+), as a sulfide.

10. The method of claim 1 wherein the treatment material is entrapped in the fine bubbles, and the fine bubbles have a diameter in a range of about 0.1 microns to 80 microns in diameter.

11. The method of claim 1 wherein the treatment material is entrapped in the fine bubbles that are in a range of about 0.5 microns to 80 microns in diameter.

12. A method for removal for contaminants from a formation, the method comprises:
   introducing treatment materials at concentrations to effect removal of contaminants into the formation, through a first well disposed at a first location with the treatment material included in coatings of fine bubbles trapping a gas, the fine bubbles having a diameter in a range of about 0.1 microns to 200 microns and specific gravity characteristic of the fine bubbles upon injection being in a range of 1.0 to 2.0; and
   operating a pump disposed in a second well at a second location that is spaced from the first location, to draw fluid through the formation into the second well and pump the fluid from the second well back into the first well at the first location.

13. The method of claim 12 wherein the treatment material is entrapped in fine bubbles that have a diameter in a range of about 0.1 microns to 200 microns in diameter.

14. The method of claim 12 wherein operating a pump further comprises:
   operating a plurality of pumps in a plurality of withdrawal wells to remove fluids from the plurality of withdrawal wells and feed the fluid back to the well at the first location.

15. The method of claim 12, further comprises:
   pulsing ambient air including ozone into the formation; and
   pulsing withdrawal of the fluid front the second location to feed the withdrawn fluid back to the first location.

16. The method of claim 12 wherein introducing further comprises:
   providing at least one injection well to introduce ambient air and ozone as the fine bubbles; and
   operating a plurality of pump at least one in each of a plurality of withdrawal well to withdraw fluid from the formation as ambient air and ozone are injected into the formation and deliver the fluid back to the at least one injection well.

17. The method of claim 16 wherein introducing further comprises:
   pulsing ambient air including the ozone into the formation from the injection well; and
   pulsing the pumps to sequentially withdraw the fluid from the plurality of withdrawal wells and deliver the withdrawn fluid back to the first location.

18. The method of claim 12 wherein introducing further comprises:
   introducing a treatment material selected from the group consisting of ambient air including ozone, air, oxygen-enriched air, catalyzed Ozone (OH•) a Fenton's Reagent; Ozone (Gas); Ozone (Molecular); Permanganate Nitrous Oxide; Hydrogen Peroxide; Hydrogen (gas); Sulfite ($SO_3^{2-}$) and Ferrous iron ($Fe^{2+}$) as a sulfate.

19. The method of claim 12 wherein the treatment material is entrapped in the fine bubbles that are in a range of about 0.1 microns to 80 microns in diameter.

20. The method of claim 12 wherein the treatment material is entrapped in the fine bubbles that are in a range of about 0.5 microns to 80 microns in diameter.

21. A method for removal of contaminants form a fractured rock formation, the method comprises:
   introducing treatment material at concentrations to effect removal of contaminants into the fractured rock formation, through at least one injection well disposed at a first location the treatment material included in coatings of fine bubbles trapping a gas, the fine bubbles having a diameter a range of about 0.1 microns to 200 microns and with a specific gravity characteristic of the fine bubbles upon injection being in a range of 1.0 to 2.0;
   operating a pump disposed in a second well at a second location that is spaced form the well at the first location, to draw fluid, including the treatment materials introduced through the fractured rock formation at the first well into the second well; and
   pumping the fluid including the treatment materials from the second well back into the first well at the first location.

22. The method of claim 21 wherein the treatment material is entrapped in fine bubbles having a diameter in a range of about 0.1 microns to 200 microns.

23. The method of claim 21 wherein operating a pump further comprises:
   operating a plurality of pumps provided, a plurality of withdrawal wells to remove fluids from the plurality of withdrawal wells and feed the fluid back to the well at the first location.

24. The method of claim 21 wherein further comprises:
   pulsing ambient air including ozone into the fractured rock formation.

25. The method of claim 21 wherein introducing further comprises:
   providing at least one injection well having a directional microporous diffuser; and
   sequencing fluid from the directional microporous diffuser to vary concentrations of contaminant in various areas or the formation.

26. The method of claim 21 wherein introducing further comprises:
   pulsing withdrawal of the fluid from the second location to feed the withdrawn fluid back to the first location.

27. The method of claim 21 wherein introducing further comprises:
   introducing a treatment material selected from the group consisting of ambient air including ozone, air, oxygen-enriched air, catalyzed Ozone (OH•) a Fenton's Reagent; Ozone (Gas); Ozone (Molecular); Permanganate Nitrous Oxide; Hydrogen Peroxide; Hydrogen (gas); Sulfite ($SO_3^{2-}$) and Ferrous iron ($Fe^{2+}$) as a sulfate.

* * * * *